June 20, 1944.   V. L. WEAVER   2,352,049
SHOCK MOUNTED INSTRUMENT
Filed Nov. 7, 1942   2 Sheets-Sheet 1
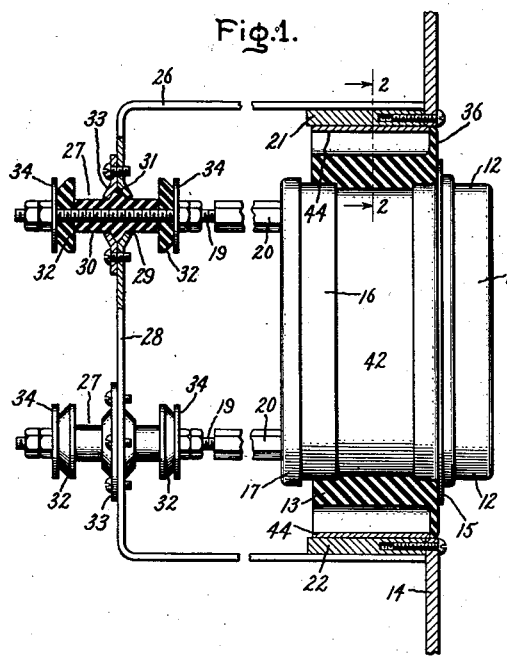
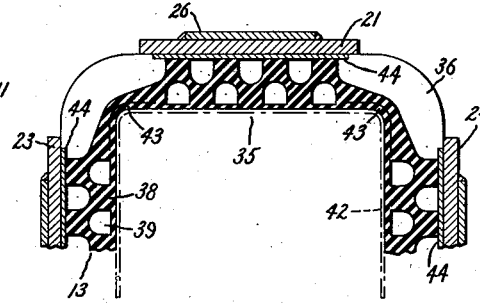
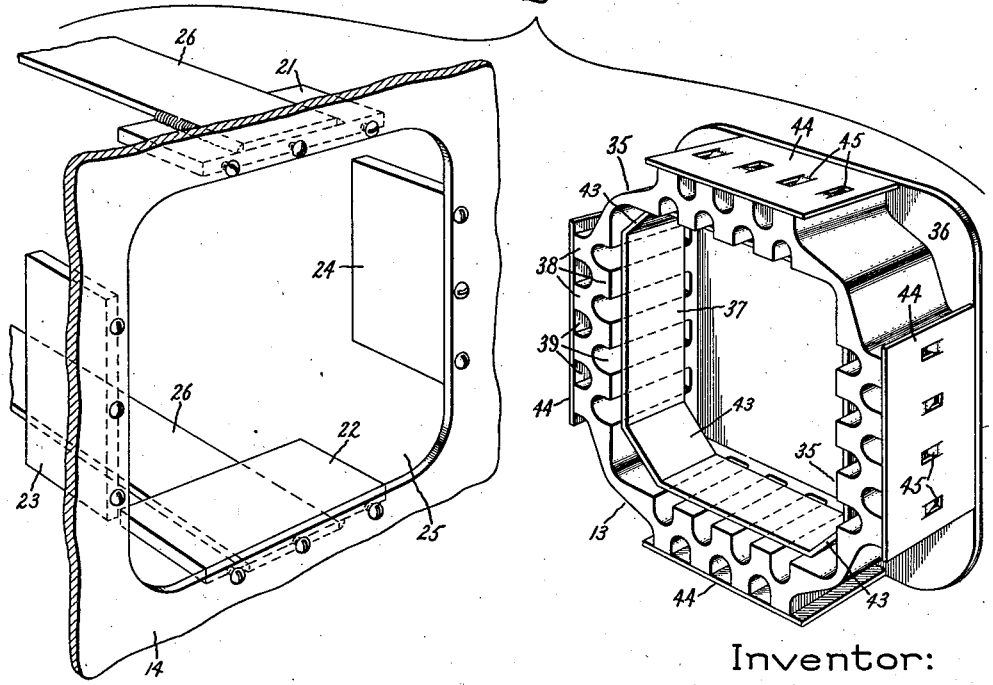
Inventor:
Virgil L. Weaver,
by Harry E. Dunham
His Attorney.

June 20, 1944. V. L. WEAVER 2,352,049

SHOCK MOUNTED INSTRUMENT

Filed Nov. 7, 1942  2 Sheets-Sheet 2

Inventor:
Virgil L. Weaver,
by Harry E. Dunham
His Attorney.

Patented June 20, 1944

2,352,049

UNITED STATES PATENT OFFICE 2,352,049

SHOCK MOUNTED INSTRUMENT

Virgil L. Weaver, Lynnfield, Mass., assignor to General Electric Company, a corporation of New York Application November 7, 1942, Serial No. 464,906

4 Claims. (Cl. 248—27)

My invention relates to instruments mounted to withstand shocks.

An object of my invention is to provide delicate instruments capable of withstanding severe shocks or sudden accelerations of supporting panels. It is an object of my invention to provide mountings for taking up shock as distinguished from merely absorbing or damping out vibrations. An object is to provide arrangements for producing relatively great displacement of an instrument with respect to a supporting panel while the instrument is being accelerated in order to follow the movement of the panel.

Other and further objects and advantages of my invention will become apparent as the description proceeds.

In carrying out my invention in its preferred form I provide a cushioning or padding member or unit for mounting a delicate instrument or the like in a housing or between confining members rigidly secured to a panel or other supporting structure, which is secured to flooring or other framework, through which very severe shocks analogous to hammer blows may be transmitted as a result of impacts applied thereto by explosive or other action. The cushioning or padding unit is composed of resilient material such as molded rubber composition or the like formed with a honeycomb or cellular structure, which permits a relatively great displacement to occur between the instrument to be protected and the supporting panel upon the initial impact of the shock to the panel. This honeycomb structure furthermore provides for: transmission of acceleration from the panel to the instrument at a rate depending upon the extent of the relative displacement; acceleration of the instrument to the velocity of the panel before the limit of relative displacement is reached; sufficiently gradual application of acceleration to prevent damage to the instrument, and yet increase of acceleration to a sufficient intensity in case of severe shocks. Damping is provided to prevent vibration and reduce overshoot.

Figure 4:
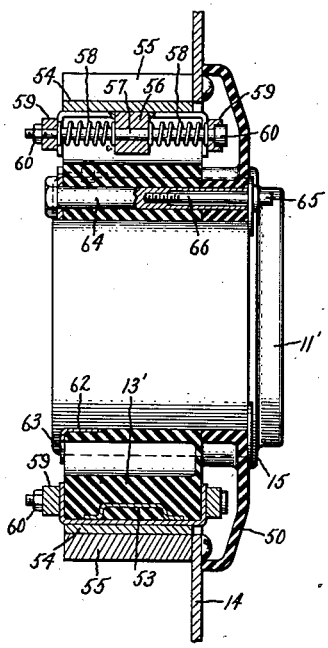
Figure 5:
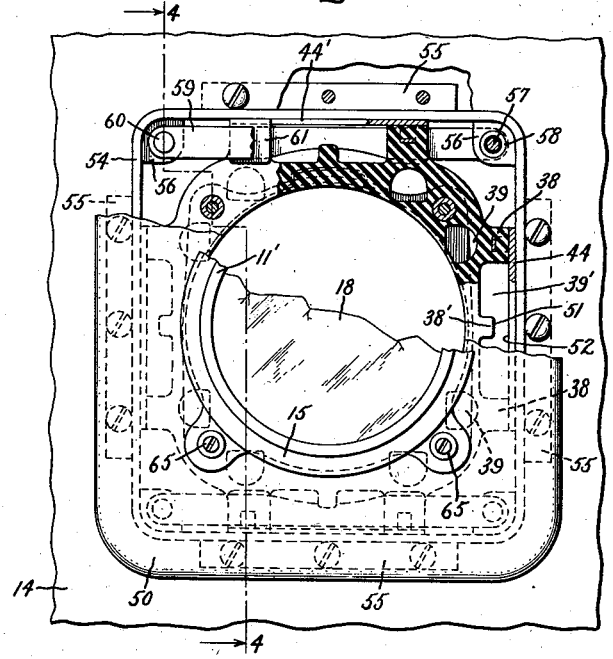
Figure 6:
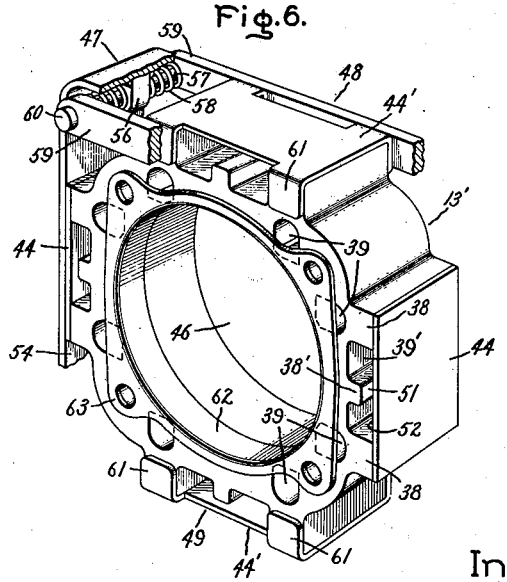

A better understanding of the invention will be afforded by the following detailed description considered in connection with the accompanying drawings. Those features of the invention which are believed to be novel and patentable are pointed out in the claims appended hereto. In the drawings Fig. 1 is a side view, partially in vertical cross-section of one embodiment of my invention; Fig. 2 is a fragmentary cross-sectional view of the portion of the apparatus cut by the plane 2—2 of Fig. 1; Fig. 2a is an outline diagram of a part of the section of Fig. 2; Fig 3 is a perspective view of a portion of the apparatus of Fig. 1, disassembled to expose the interior and show the internal construction; Fig. 4 is a view corresponding to Fig. 1, showing another embodiment of my invention with a round-case instrument instead of a square-case instrument; Fig. 5 is a fragmentary face view of the apparatus of Fig. 4, with a portion thereof broken away to expose the interior construction; and Fig. 6 is a fragmentary perspective view of the apparatus of Figs. 4 and 5, seen from the rear. Like reference characters are used throughout the drawings to designate like parts.

An arrangement in accordance with my invention for mounting a square-case instrument to be resistant to shocks or sudden impacts upon its supporting panel is illustrated in Figs. 1 to 3. There is shown an instrument in a square case 11 (having rounded corners 12), with a resilient mounting or cushion unit 13, and a supporting panel 14, represented only in part. It will be understood that the panel 14 rests upon flooring or framework (not shown) to which it is preferably made fast. My invention is not concerned with the particular type of instrument to be mounted on the panel 14. It may be a delicate deflecting-pointer moving-element electrical measuring instrument, a relay, a meter or any device which must be securely mounted, but is not itself capable of withstanding severe shocks, violent impacts or sudden accelerations, to which the panel 14 may be subjected directly or by forces applied to the framework or flooring (not shown) supporting the panel 14. In view of the rough treatment which the panel 14 may be assumed to receive, it is represented as being composed of a high-strength material, such as steel plate.

The square instrument case 11 is shown as being of the conventional type designed for flush mounting on a panel and having a flange 15, which would normally rest against a mounting panel along the edges of an instrument-receiving opening in the panel. The casing 11 has a removable back cover 16 with a slightly raised rim 17.

Although the instrument case 11 need not be arranged with its face (usually with a transparent window) visible from the front of the panel, the apparatus is described with this arrangement assumed for the sake of illustration and convenience in explanation.

The instrument is arranged with its face 18 (see Fig. 5), usually with a transparent window (not visible in the view presented by Fig. 1), exposed at the front of the panel 14, which is the right-hand side of the panel as shown in Fig. 1. The instrument casing 11 is shown with electrical terminal screws 19 extending from terminal studs 20, projecting rearwardly through the back cover 16.

Instead of securing the instrument case 11 directly to the panel 14, as might be done in the case of a panel not liable to shocks and violent impacts, the cushion unit 13 is provided, into which the casing 11 is fitted and a housing or set of confining walls is secured to the panel 14 for supporting and confining the cushion unit 13. In the arrangement of Figs. 1–3, the set of confining walls consists of two horizontal plates 21 and 22, and two vertical plates 23 and 24. The plates 21—24 are secured to the back surfaces of the panel 14 perpendicular thereto along the margins or edges of an opening 25 in the panel 14. Thus the plates 21—24 define a space into which the cushion unit 13 fits.

For better supporting the rearwardly extending terminal screws 19 and taking up forward and backward relative displacement between the instrument and the panel 14, there are provided a terminal supporting member such as a yoke 26 or U-shaped bracket and resilient or cushioning bushings 27. The yoke 26 is secured to the panel 14. For example, as shown, it may have ends attached, as by welding, to the horizontal plates 21 and 22. The bridge portion 28 of the yoke 26 has openings 29, through which the terminal screws 19 are adapted to pass. The bushings 27 fit in the openings 29 around the terminal screws 19. They are composed of suitable insulating and resilient material, such as molded rubber composition, for example. As shown the bushings 27, each consist of a sleeve portion 30 having an integral center enlargement or circular rib 31 and end flares 32. The margins of the yoke openings 29 are dished, and dished washers 33 are provided, which are attachable against the yoke 26 for securing the bushings 27 in the yoke openings 29 by clamping the bushing ribs 31. Nut-backed washers 34 are mounted on the terminal screws 19 to provide abutments or stops for the end flares 32 of the bushings 27, to control and limit the back and forth displacement of the instrument casing 13 with respect to the panel 14 and the yoke bridge 28. The bushings 27 do not in themselves constitute my invention, and they may be of the type known as "Lord mountings."

The novel construction of the cushion unit 13 may be perceived most clearly from Figs. 2 and 3. It is shown molded as an integral unit including cellular or honeycomb pad portions 35, a face, or window-frame portion 36, and a strap or liner portion 37. The unit 13 may be composed of any suitable resilient material having the requisite strength and elasticity in tension, shear and compression, such as molded rubber composition. The pad portions 35 are honeycombed, i. e., they are of such cellular structure as to form in effect two or more rows of blocks arranged in checkerboard fashion, with the blocks in one row opposite spaces between blocks in the adjacent row, and with a wall or membrane between adjacent rows of blocks to unite the structure and yield in tension as will be explained more in detail hereinafter. Thus in the enlarged fragmentary outline diagram, Fig. 2a, representing a portion of the outline of the cross-section of the pad portion 35 seen in Fig. 2, reference numerals are applied to designate the "blocks" 38, the "spaces" 39 and the connecting "membrane," which lies along the wavy dotted line 40. The "membrane" 40 includes bridging portions 41, actually uniting adjacent corners of "blocks" in adjacent rows.

The strap portion 37 of the cushion unit is dimensioned to fit within and around the slightly depressed surface of the instrument casing 11 formed by the portion of its side walls 42 between the front and back covers of the casing 11. As formed, the four corner portions 43 of the strap portion 37 or liner are made short to form straight diagonals as shown in Fig. 3, which are stretched when the instrument casing is inserted to the rounded square corner shape shown in Fig. 2, for more secure attachment to the instrument casing. It will be observed that the liner 37 is shown as integral with the adjacent block portions of the pad portion 35 of the cushion unit. The window-frame portion 36 of the cushion unit serves to close the gaps between the instrument face 18, and the edges of the panel opening 5.

Friction plates or slide plates 44 are provided to which the outer surfaces of the outside row of "blocks" of the pad portions 35 of the cushion unit are bonded. For insuring permanent attachment of the slide plates 43 to the cushion unit, the plates 44 are provided with punched tongues 45 and these tongues are placed as inserts in the cushion unit 13 at the time it is molded. The cushion unit 13 is placed on the casing 11 by stretching the liners 35 and 43 sufficiently to allow the cushion 13 to slide over the supporting rim 15 or 16. It will be understood that to facilitate insertion of the casing 11 into the cushion unit 13, the raised-rim back cover 16 may be removed temporarily.

When the panel 14 is subjected to a violent impact it is highly accelerated and starts to move abruptly, but, by reason of my mounting arrangement the instrument is more gradually accelerated. Before the instrument casing 11 has been driven against one of the cushion confining walls 21—24, its velocity has been brought up to that of the panel. Upon return motion, if any, of the panel the same action takes place. Some initial acceleration is transmitted to the instrument by the sliding friction between at least one pair of the slide plates 44 and the adjacent confining plates 21—24, regardless of the direction of relative displacement. This initial acceleration is proportional to the amount of friction between the instrument and the panel, whereas the acceleration produced by compression of the rubber supporting member is proportional to the relative displacement of the instrument and the panel. Therefore, the supporting member can impart acceleration to the instrument only after the panel has moved a finite distance, whereas the friction plates apply acceleration to the instrument at the instant of impact. This initial acceleration is well below that value of acceleration that will damage the instrument, and is independent of the initial acceleration of the panel. This friction also helps to minimize overshoot and reduce vibration.

The relative displacement between the instrument casing and the panel may be resolved into displacement along three mutually perpendicular coordinates or directions, viz: up and down, sidewise or right and left along the plane of the panel, and back and forth perpendicular to the plane of the panel. In the case of back and forth motion, perpendicular to the panel, the relative displacement is taken up by the bushings 27 and such motion is damped out by the friction of all four slide plates 44, sliding along the plates 21—24.

In case of up and down or sidewise motion parallel to the panel 14, the cushion unit 13 functions to take up relative displacement and either the side friction plates slide along the plates 23 and 24 to damp out overshoot or the top and bottom friction plates slide along the plates 21 and 22 to damp out overshoot. The honeycomb structure of the cushion unit 13 causes it to permit large relative displacement of the panel and the instrument casing without abrupt stoppage at the physical limits of the permitted relative displacement. In fact such physical limits are never reached because the instrument case is brought up to the velocity of the panel before the pad portion 35 of the cushion unit 13 has been compressed an amount approaching the limit.

The action of the honeycomb structure in permitting large relative displacement, and gradual acceleration of the instrument, but bringing it up to the panel velocity before the honeycomb is fully compressed may be seen by analyzing the structure. The initial impact setting the panel in motion, causes (1) an initial acceleration caused by the friction plates and (2) the commencement of a relative displacement between the instrument casing and the panel, starting to squeeze one of the pad portions 35 of the cushion unit 13 between the instrument casing wall 42 and one of the confining plates, e. g., the plate 23. First the "membrane" or portion of the cushion unit along the dotted line 40 (Fig. 2a) tends to be stretched or put in tension with the bridge portions 41 in shear or in bending stress. This causes the application of a small force of acceleration to the instrument case which increases steadily, however, as the tension along the line 40 increases with increased relative displacement. Then if further relative displacement occurs the "blocks" 38 of one row tend to squeeze into the spaces 39 between the "blocks" 38 of the adjacent row of "blocks." This produces wedging action, requiring greater force and results in progressively increasing the rate of acceleration of the instrument casing. If relative displacement were continued to the point of filling the spaces 39 with the "blocks" 38, the "blocks" 38 would be stressed in direct compression and even greater force would be applied still more rapidly accelerating the instrument and preventing impact against the instrument casing. In practice, however, the relative displacement does not continue this far. The sliding friction of the slide plates 44 along the plates 21 and 22 (in the case of horizontally acting impact) serves to apply a uniform initial force for gradually accelerating the instrument casing 11 upon the initiation of relative displacement.

The resilient bushings 27 or the "Lord mountings" take up back and forth relative displacement, and aided by the friction of the slide plates 44, accelerate the instrument casing 11 to bring the velocity of the casing up to that of the panel 14 in case of impact perpendicular to the panel 14. However, this action need not be as effective as that of the honeycomb pad portions 35 of the cushion unit 13 functioning in the case of impacts in a direction parallel to the panel 14. This results from the fact that the panel 14 is weaker with respect to force applied perpendicularly thereto than with respect to force applied in a direction parallel thereto so that the shock with respect to back and forth direction of the instrument would tend to be less violent than with respect to shock in a direction parallel to the surface of the panel 14.

Although I have described and illustrated a particular embodiment of my invention in Figs. 1 to 3, it will be understood that my invention is not limited to the specific details illustrated and described. In the case of smaller and lighter instruments which need not have separate support for projecting terminal screws and which are light enough not to require independent resilient support with respect to relative displacement perpendicular to the panel, an arrangement may be employed in which the cushion unit for taking care of vertical or horizontal shocks also serves to transmit accelerations for avoiding shock from impacts perpendicular to the direction of the panel. For example, in the arrangement illustrated in Figs. 4, 5 and 6 a honeycomb cushion unit 13' may be employed having in this case a circular inner opening 46 to receive a cylindrical instrument casing 11'. The requisite controlled latitude of movement with respect to motion perpendicular to the panel 14 is provided by a spring mounting 47 (Fig. 6) which will be described more in detail hereinafter.

The upper and lower pad portions 48 and 49 of the cushion unit 13' provide the means of transmitting gradual accelerating force from the spring unit 47 to the instrument casing 11' as will be explained more in detail hereinafter. The cushion unit 13' may be similar to the unit 13 illustrated in Figs. 1 to 3 except for the shape of the instrument receiving opening therein. If desired, however, a separate overhanging "picture frame" or flared portion 50 may be provided for covering an unsightly gap between the flange 15 of the instrument casing 11' and the edges of the opening in the panel for receiving the instrument. The cushion unit 13' also employs cellular honeycomb structure previously described in connection with the cushion unit, but the structure may if desired be simplified as shown in Figs. 5 and 6. In comparing the arrangement of Figs. 5 and 6 with that of 2A, it will be seen that there are fewer spaces 39 and 39' between the solid portions of the cushion unit. On the other hand, in the arrangement of Figs. 4, 5 and 6 one of the "block" portions 38' is made shorter than the adjacent "block" portions 38, in this manner providing a more gradual deformation of the cushion unit until the outer surface 51 of the block portion 38' comes into abutment with the inner surface 52 of the slide plate 44.

As in the case of the arrangement of Figs. 1 to 3 slide plates or friction plates are provided which are bonded to the cushion unit 13' and are preferably further secured thereto by means of molded-in inserts, one of which is illustrated at 53 in Fig. 4.

In the arrangement of Figs. 4, 5 and 6, instead of employing separate confining plates 21 to 24 for enclosing the cushion unit, I have illustrated an integral shell 54 in the shape of a hollow square which is secured to the back surface of the panel 14. For example, a pair of supporting blocks 55 may be screwed or otherwise secured to the back surface of the panel 14 and the shell 54 may be welded or otherwise secured to the supporting "blocks" 55. The inner surfaces of the shell 54 serve as the friction surfaces along which the slide plates 44 and 44' slide for the purpose of aiding initial acceleration and absorbing energy to damp out possible overshoot.

For supporting the spring arrangement 47, lugs 56 are secured in the inner corners of the cushion-confining shell 54. As illustrated the lugs 56 are welded in position. Such lugs 56 are provided in each of the four corners of the shell 54 but for clarity only one of them is shown in Fig. 6. Each of the lugs 56 has an opening in which a rod 57 is inserted with ends projecting in either direction from the lug 56. Each end of the rod 57 carries a helical compression spring 58. For transmitting the action of the springs 58 to the cushion unit 13' and thus to the instrument casing 11', a pair of limit straps 59 is provided at the upper end of the shell 54, and a similar pair of limit straps (not shown in Fig. 6) are provided at the lower end of the shell 54. Each of the limit straps 59 has an opening in the end through which one end of one of the spring rods 57 passes and a suitable means 60 such as an enlarged head, cotter pin, nut, or the like is provided for preventing the limit strap 59 from sliding off the end of the rod 57. The helical springs 58 are so dimensioned that the inner ends bear against the lugs 56 and the outer ends bear against the limit straps 59 and hold them against the bolt heads or nuts 60.

The lengths of the rods 57 are made such that the spacing of each pair of limit straps 59 is just sufficient to cause the limit straps to fit against the front and back surfaces of the upper portion (or the lower portion) of the cushion unit 13'. Preferably, however, the upper and lower slide plates 44' have bent-over wings 61 to provide more durable abutting surfaces for contacting the inner surfaces of the limit straps 59.

In case of impact to the panel 14 in a direction parallel to its surfaces relative displacement between the instrument casing 11 and the panel 14 is permitted and such relative displacement is taken up by the honeycomb structure cushion unit 13' in the manner described in connection with Figs. 1 to 3. In case of impacts perpendicular to the surface of the panel 14 relative displacement between the structure 11' and the panel 14 is permitted by the resilience of the springs 58, and also by axial resilience between surfaces 61 and 63, Fig. 6 (rubber member 13 in tension). Thus, the instrument casing 11' secured in the inner opening 46 of the cushion unit 13' is allowed to have a displacement relative to the panel 14 by the compression of all the helical springs 58 on one side of the lugs 56 and the sliding of the rods 57 through the openings in the lugs 56. For example, if the panel 14 starts to move backward, the shell 47 also starts to move backward carrying the lugs 56 backward and compressing the rearward springs 58 and causing the front limit straps 59 to bear against the front bent-over wings 61 of the slide plates 44'. The spring force, together with the slide plate friction gradually accelerates the cushion unit 13' and the instrument casing 11' so that the instrument casing 11' is gradually brought up to the velocity of the panel 14.

In order to insure securement of the instrument casing 11' in the opening 46 in the cushion unit 13', the instrument casing 11' is preferably provided, not only with the front flange 15, but also with a removable auxiliary back flange 62. The flange 62 has ears 63 with openings adapted to receive hollow-ended bolts 64. As illustrated in Fig. 4 the bolts are inserted in the openings in the ears 63 with the heads bearing against these ears and with smaller machine screws 65 inserted in corresponding openings in the front flanges 15 with screw heads bearing against the flanges 15 and with shanks 66 threaded into the internal openings in the hollow ended bolts 64.

I have herein shown and particularly described certain embodiments of my invention and certain methods of operation embraced therein for the purpose of explaining its practice and showing its application, but it will be obvious to those skilled in the art that many modifications and variations are possible, and I aim therefore to cover all such modifications and variations as fall within the scope of my invention which are defined in the appended claims.

What I claim as new and desire to secure by Letters Patent of the United States is:

1. A shock mounted instrument comprising in combination a supporting panel with an instrument-receiving opening therein, an instrument having an enclosing casing with terminals projecting therefrom rearwardly, and a resilient mounting, said panel having an opening with two pairs of rearwardly extending plates secured perpendicular to the panel at the edges of the opening, the plates of one pair being perpendicular to those of the other, the plates of each pair being parallel to each other and spaced for the said mounting to fit between the plates, one pair of said plates having a rearwardly extending terminal supporting yoke secured thereto, said mounting being composed of resilient material of honeycomb structure and having an opening therein fitting the said instrument casing, said terminal-supporting yoke having openings through which said terminals pass and bushings composed of resilient material engaging said terminals and the margins of said terminal openings in said yoke.

2. A shock mounted instrument comprising in combination a supporting panel with an instrument opening therein, an instrument having an enclosing casing, and a resilient mounting, said panel having a shell secured thereto with a wall along the edges of said opening perpendicular to said panel, said shell having lugs secured to the inner surface of said wall, said mounting comprising a honeycomb structure composed of resilient material fitting within said shell for taking up motion of the instrument against the shell surface, limit straps against portions of said honeycomb structure, and springs engaging said lugs and said limit straps for taking up motion of the instrument parallel to said shell.

3. A shock mounted instrument comprising in combination a supporting panel with an instrument opening therein, an istrument having an enclosing casing, and a resilient mounting, said panel having instrument confining members secured thereto along the edges of said opening and extending in a direction transverse to the panel, said mounting comprising honeycomb-structure resilient material formed to fit within said instrument confining members, and having an opening therein fitting the said instrument casing.

4. A shock-resistant mounting arrangement for electrical instruments and the like having enclosing casings, said arrangement comprising instrument-confining flat plates arranged to define, except at the corners, a rectangular opening of greater size than the instrument casing, and a honeycomb-structure cushion unit composed of resilient material having flat plates secured to its outer surfaces which have sliding fits with the inner surfaces of said instrument-confining flat plates, said cushion unit having an opening therein of the size and shape adapted to fit the casing on an instrument which is to be mounted for resistance against shock.

VIRGIL L. WEAVER.